United States Patent [19]
Iwamoto et al.

[11] Patent Number: 5,787,002
[45] Date of Patent: Jul. 28, 1998

[54] CONTROL SYSTEM FOR PRODUCTION FACILITIES

[75] Inventors: Hiroshi Iwamoto; Masato Ueyama; Tatsurou Morimoto, all of Hiroshima-ken, Japan

[73] Assignee: Mazda Motor Corporation, Hiroshima-ken, Japan

[21] Appl. No.: 413,875

[22] Filed: Mar. 29, 1995

[30] Foreign Application Priority Data

Mar. 29, 1994 [JP] Japan .................................. 6-059169
Oct. 27, 1994 [JP] Japan .................................. 6-289099

[51] Int. Cl.⁶ ........................................................ G06F 19/00
[52] U.S. Cl. .............................. 364/468.22; 364/468.23; 364/474.11; 364/474.17
[58] Field of Search ...................... 364/468, 478, 364/132, 131, 133–135, 468.01, 468.02, 468.05, 468.15, 474.11, 468.18, 468.19, 468.22, 468.23, 474.16, 474.18, 474.17

[56] References Cited

U.S. PATENT DOCUMENTS

| | | | |
|---|---|---|---|
| 5,088,045 | 2/1992 | Shimanaka et al. | 364/468 |
| 5,150,288 | 9/1992 | Imai et al. | 364/132 |
| 5,202,836 | 4/1993 | Iida et al. | 364/468 |
| 5,231,585 | 7/1993 | Kobayashi et al. | 364/468 |
| 5,321,619 | 6/1994 | Matsuda et al. | 364/468 |
| 5,347,463 | 9/1994 | Nakamura et al. | 364/478 |

FOREIGN PATENT DOCUMENTS 3-246704  5/1991  Japan .
6-106459  4/1994  Japan .

*Primary Examiner*—Reba I. Elmore
*Assistant Examiner*—Thomas E. Brown
*Attorney, Agent, or Firm*—Morrison & Foerster LLP

[57] ABSTRACT

A control system for controlling a production facility, including a plurality of work stations each of which is provided with an automatically controllable working apparatus, has a control device for controlling the working apparatus so as to perform specified working and a data communications network through which the control means communicates data on operation of the working apparatus with other work stations so as to reflect the data in operation of each working apparatus.

10 Claims, 11 Drawing Sheets

| | HEAD No. | TOOL No. | COUNTED SERVICE NUMBER | EXTREAM SERVICE NUMB |
|---|---|---|---|---|
| MACHINE W1 | No. 1 HEAD | No. 3 | . . . . . . | . . . . . . |
| | | No. 4 | . . . . . . | . . . . . . |
| | | No. 7 | . . . . . . | . . . . . . |
| | | No. 10 | . . . . . . | . . . . . . |
| | No.2 HEAD | No. 2 | . . . . . . | . . . . . . |
| | | No. 6 | . . . . . . | . . . . . . |
| | | No. 7 | . . . . . . | . . . . . . |
| | | No. 9 | . . . . . . | . . . . . . |
| | No.3 HEAD | | | |
| | | | | |
| | | | | |
| | | | | |

FIG. 15

| | FAILURE CODE | TYPE OF FAILURE |
|---|---|---|
| MACHINE No. 1 | EM10001 | ELECTRIC CIRCUIT |
| | EM10002 | CONTROL SYSTEM |
| | EM10003 | SENSOR; SWITCH |
| | EM10004 | CONTROL PANEL |
| | EM10005 | MAIN SHAFT MOTOR |
| | EM10006 | X-AXIS MOTOR |
| | EM10007 | Y-AXIS MOTOR |
| | EM10008 | |
| | ⋯ | ⋯ ⋯ ⋯ ⋯ ⋯ |
| | EM10198 | ⋯ ⋯ ⋯ ⋯ ⋯ |
| | EM10199 | ⋯ ⋯ ⋯ ⋯ ⋯ |
| | EM10200 | ⋯ ⋯ ⋯ ⋯ ⋯ | ns
CONTROL SYSTEM FOR PRODUCTION FACILITIES

BACKGROUND OF THE INVENTION

1. Field of the invention

The present invention relates to a control system for a production facility for performing progressively predetermined working on a workpiece at a plurality of work stations arranged along a workpiece transportation line.

2. Description of Related Art

In the course of increasing automation of a production facility, it has proved to be necessary to automate and simplify as far as possible the gathering of information on workpieces by lot so as to seize the existing conditions of running stock. It has been proposed in, for instance, Japanese Unexamined Patent Publication No. 3-246704 to exchange information on the workpieces, through information transfer units, between work stores and various work stations for performing necessary working on workpieces in an automatic production line. The automatic production control system described in the publication mentioned above is configured such that a control unit centralizes and controls information on a lot of workpieces at each of the work stations and provides for a working apparatus an instruction signal so that the working apparatus performs predetermined working on a workpiece. This teaching alludes to a comprehensive design of the production line including control systems. This imposes various constraints upon designing of circuits and sequence flow charts for various control units which are always undesirable. For example, designing details of particular control units after the completion of comprehensive design of the production line needs a long time and is troublesome in such a case an entire circuit of the control system must be changed even when the control system is locally changed in a manufacturing specification.

It has been also known for a long time to exchange the tool for a new one every a predetermined number of times of services to achieve, on one hand, a maximum of finished workpieces and, on the other hand, a uniform quality. Much attention have been given to tool exchange techniques which involve the imparting of information on the number of times of services of a tool now in use and an exchange of tolls and various efforts have been made to count the number of times of services.

One such effort is that described in Japanese Unexamined Patent Publication No. 6-106459. The approach used in a production facility, such as a transfer machine, was to count the numbers of times of services of tools now in use in a work station by a counter provided in a sequence control unit of each work station, respectively, and display the counted number. With this tool exchange, the sequence control unit monitors the numbers of times of services of tools of its associated work station only. Consequently, in order to draw up a list of tools to be replaced at a plurality of work stations, it is necessary to make a tour of counter-reading round the counters of the work stations which takes a plenty of time and is troublesome. Further, it is often necessary to exchange tolls by work station, so that the production facility has to be suspended with every tool exchange, resulting in one of causes of declined productivity. In other words, this approach is impossible to unify information on tool exchange and increases information to be processed in total quantity, rendering the information adverse to be put to effective utilization.

Another approach is to count the numbers of times of services of tools now in use in a plurality of work stations by a counter provided in a line sequence control unit and display the expiration of service of each tool. This system enables to search inappropriate tools of the work stations upon a warning of tool and exchange them all of a lump. While the system may have an advantage of unified data control over the prior art, nevertheless, it is impossible to display necessary information on each sequence control unit, being unfavorable to effective utilization of the information.

In addition, as taught by the systems described above, it is hardly conceivable to draw up a list of tools to be replaced of all of the production line. Further, there is not prepared in the production line any system for transmitting information on failure of the respective work stations to the control unit, leaving various troublesome working for operators to manage production control information and the purchase of repair parts.

SUMMARY OF THE INVENTION

It is an object of the present invention to provide a production facility control system which enables it easy to design component control units and to change in design of these component control units according to modifications of system specifications.

It is another object of the present invention to provide a production facility control system which unifies and manages information on operation of a plurality of working apparatuses, whereby reducing a data processing load on the control system and puts the information to effective practical use.

The above objects of the present invention are achieved by providing a control system, for controlling a production facility including a plurality of work stations arranged along a workpiece transportation line, each work station being provided with a working apparatus having a plurality of automatically controllable component devices. The working apparatus control means, which controls its associated working apparatus to perform specified working on workpieces, comprises a terminal control means, formed as a replaceable unit for each component device, for controlling the each component device to perform specific operation of the each component device, a data communications control means for controlling communication of data on operations of the respective working apparatuses among the work stations, and an operation control means for governing all of the terminal control means and the data communication control means and unifying data on operation of the respective working apparatuses so that data transmitted to one work station from other work stations is reflected in the operation of the working apparatus in the one work station. The working apparatus control means further comprises a data communications line for interfacing these terminal control means, data communication control means and operation control means to one another. A workpiece transportation line control means provides a drive instruction signal, based on data on operating conditions of each working apparatus transmitted through the data communication control means, with which the workpiece transportation line transports workpieces.

The terminal control means is adapted so as to detect conformity to starting conditions of its associated component device, provide a start instruction signal to the component device so as to cause operation of the component device, and detect failure in operation of the component device. The working apparatus control means assigns an identification number to data transmitted from each terminal control means to the data communications line. On the other hand, the data communication control means assigns an identification number to data transmitted from one work station to the remaining work station therefrom.

The production facility control system may further include an intermittent control means, interfaced to the working apparatus control means by means of a data communications network so as to communicate data on operations of the working apparatuses with one another, for governing the working apparatus control means for the respective working apparatuses and unifying data on operation of the respective working apparatuses transmitted from the respective working apparatus control means so as to present predetermined attributes of data, and an inclusive control means, such as comprising a host computer, interfaced to the respective intermittent control means by means of a data communications network so as to communicate data with one another, for governing the intermittent control means for the respective work stations and unifying data transmitted from the respective intermittent control means. The intermittent control means transmits, on one hand, data among the predetermined attributes of data intrinsic to each working apparatus to its associated working apparatus control means and, on the other hand, data of the predetermined attributes of data to the inclusive control means.

The data on operation include a number of times of working that a tool of each working apparatus has serviced and failure of each working apparatus, and the predetermined attributes of data includes the number of times of serviced working and a predetermined extreme number of times of working that a tool of the working apparatus is expected to serve. The working apparatus control means displays data on the number of times of working of each tool of the working apparatus included in the predetermined attributes of data transmitted from the intermittent control means. On the other hand, the inclusive control means lists and displays data on exchanges of tools of the respective working apparatus included in the predetermined attributes of data transmitted thereto from the intermittent control means.

With the production facility control system of this invention, each operation control means judges, in cooperation with data or information on conditions of working apparatuses of other work stations transmitted from other work stations, starting conditions of working apparatuses of its associated work station so as thereby to enables autonomous operation of the working apparatuses of the work station. In addition, each terminal control means of each working apparatus judges, in cooperation with data or information from the remaining terminal control means of the working apparatus, whether its associated component device is ready for start, so as whereby to enable autonomous operation of the working unit of the working apparatus.

Together, because the main operation control means receives and unifies information on the numbers of times of services of working tools, transmitted from the respective intermittent control means, it is loaded with much less processing load relating to exchange of working tools. Furthermore, since the main operation control means transmits information on exchange of working tools to the respective intermittent control means, unified control of information is not accompanied with any adverse effect. In addition, the inclusive control means receives information on the numbers of times of practical working services and available working services, and provides a list of working tools to be exchanged based on the information, the information on the numbers of times of services is effectively used.

BRIEF DESCRIPTION OF THE DRAWINGS

The above and other objects and features of the present invention will be clearly understood from the following description with respect to a preferred embodiment thereof when considered in conjunction with the accompanying drawings, in which same reference numerals have been used to denote the same and similar parts or elements throughout the drawings and wherein:

FIG. 15 is an illustration of a table of failure codes.

DETAILED DESCRIPTION OF THE PREFERRED EMBODIMENTS

Figure 1:
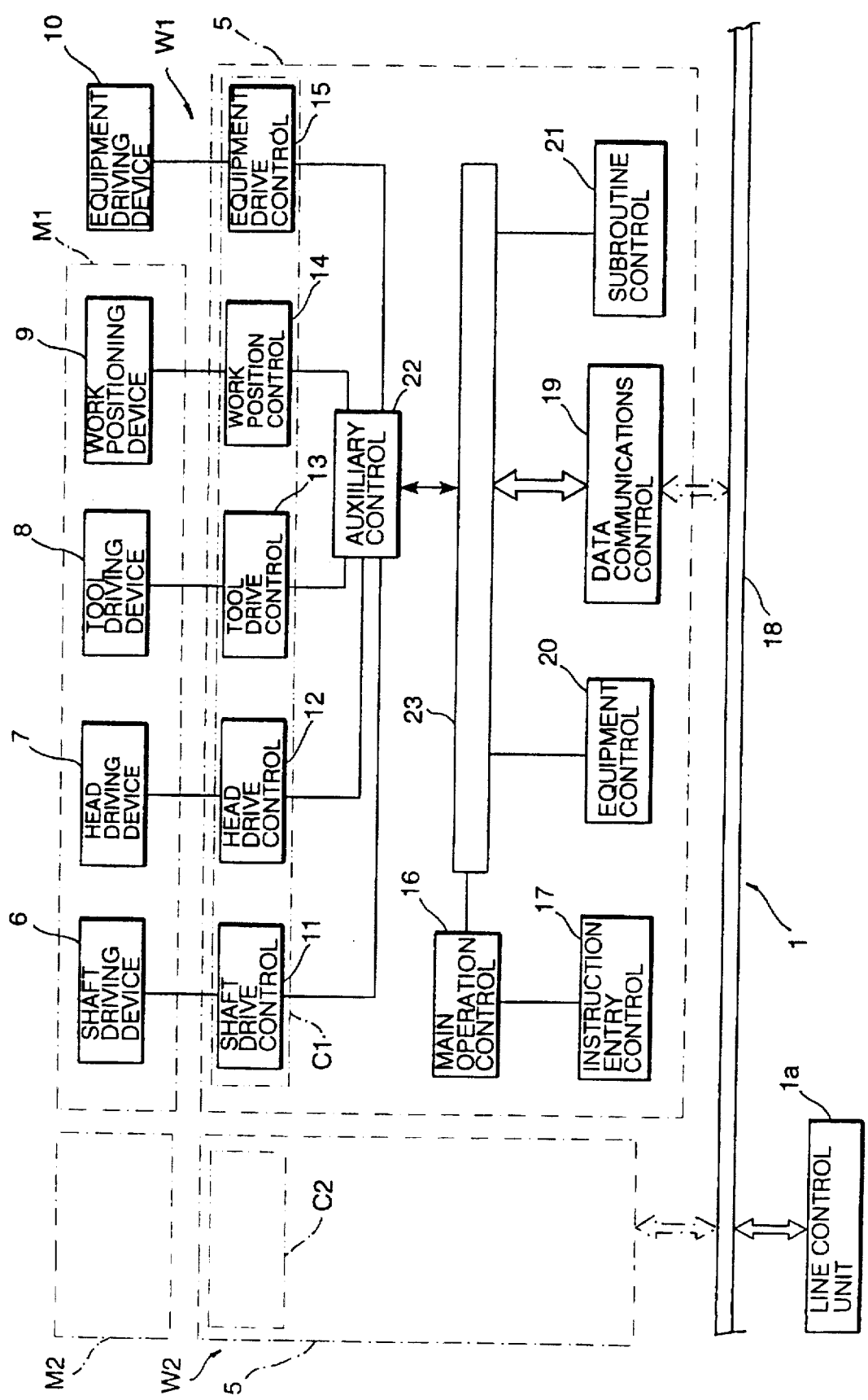
FIG. 1 is a block diagram schematically illustrating a production facility control system in accordance with a preferred embodiment of the present invention.

Referring now to the drawings in detail, and in particular, to FIG. 1, a production facility control system in accordance with a preferred embodiment of the invention is shown. A production facility includes a workpiece transportation line 1 along which a plurality of work stations are disposed. Each work station includes a plurality of working apparatuses W1, W2 . . . , such as transfer machines. The workpiece transportation line 1 is controlled in operation by means of a transportation signal provided by a line control unit 1a. Each of the working apparatuses W1, W2, . . . comprises a working unit M1, M2, . . . and a sequential control device 5, comprising mainly a microcomputer, as a working apparatus control means or unit, for sequential control of operation of the working apparatus W1, W2, . . . . The working apparatus W1, only schematically illustrated in block diagram in FIG. 1, includes a plurality of automatically controllable component devices. In this instance, the automatically controllable component devices include a shaft driving device 6 for rotating a shaft (not shown) to which a working tool is attached, a head driving device 7 for driving a tool head so as to exchange a tool attached to the shaft with a brand-new tool, a tool driving device 8 for changing the tool in position, and a work positioning device 9 for positioning a workpiece. Together, the working apparatus 4 is attached with a equipment driving device 10 for driving various supplementary equipments, including a hydraulic pressure supply equipment, a coolant supply equipment and a drive air supply equipment, for necessary to complete operation of these component devices.

The sequential control device 5 includes various terminal control means, for controlling independently operation of the respective component devices 6–10, which include a shaft drive control unit 11, a head drive control unit 12, a tool drive control unit 13, a work position control unit 14 and an equipment drive control unit 15. These terminal control unit means 11–15 are configured as replaceable units. In addition, the sequential control device 5 includes a main operation control means 16, an instruction entry control 17 for allowing entry of operation instructions into the main operation control 16, a data communications control unit 19 for controlling data communication with both a sequential control device 5 of another working apparatus W2 and the line control unit 1a through an in-line network 18. The main operation control unit 16 governs these individual terminal control unit means 11–15 and data communication control unit 19. The sequential control device 5 further includes an assisting equipment control unit 20 for controlling various assisting equipments including a display device (not shown), a subroutine control unit 21 for performing a failure transaction subroutine upon an occurrence of failure to the respective terminal control units 11–15, an auxiliary control unit 22. The auxiliary control unit 22 has one of functions to assign specifying or identifying numbers to data transmitted to the main operation control unit 16 from the respective terminal control units 11–15. Through a common data bus 23, data communication is made among the respective control units 16–22.

Figure 2:
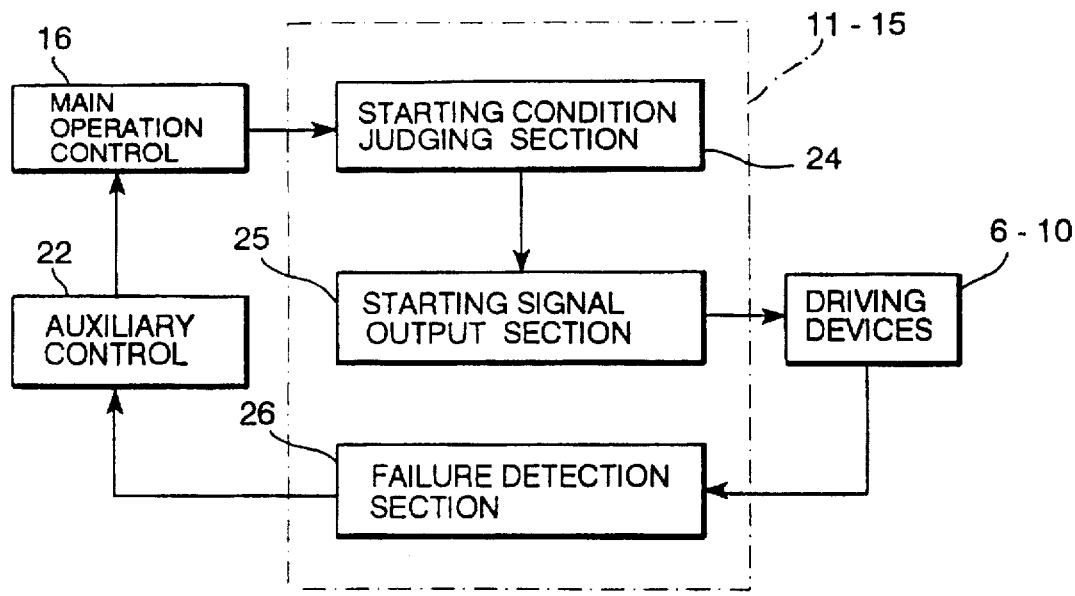
FIG. 2 is a block diagram schematically illustrating a terminal control unit.

As shown in FIG. 2, each of the terminal control units 11–16 includes three sections, namely a starting condition judging section 24, a starting signal output section 25 and a failure detection section 26. The starting condition judging section 24 judges, on the basis of signals transmitted from the main operation control unit 16 and the component devices 6–10, whether the respective component devices 6–10 are ready for starting. The starting signal output section 25 provides for the respective component device 6–10 starting signals at an appropriate timing upon satisfaction of starting conditions. The failure detection section 26 provides for the main operation control unit 16 a failure signal indicating an occurrence of failure of any component device 6–10.

Figure 3:
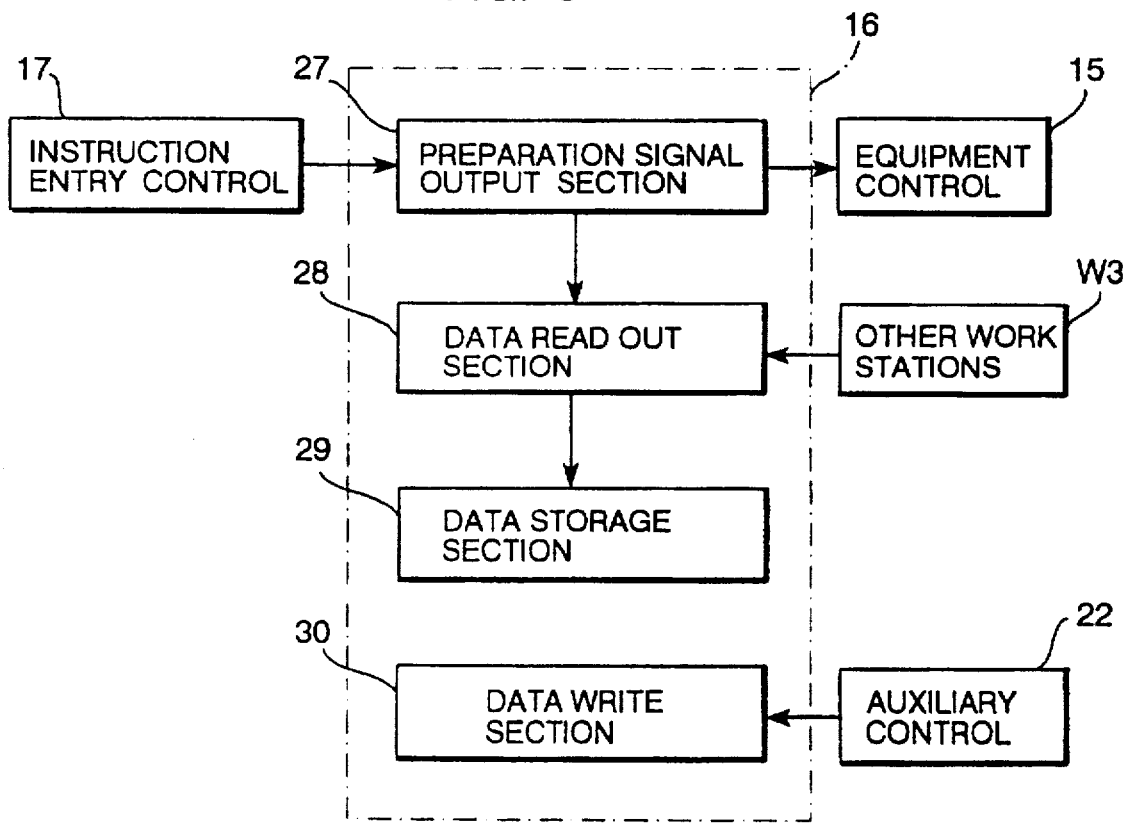
FIG. 3 is a block diagram schematically illustrating a main operation control unit.

As shown in FIG. 3, the main operation control unit 16 includes four sections, namely a preparation signal output section 27, a data read-out section 28, a data storage section 29 and a data write section 30. The preparation signal output section 27 provides for the supplementary equipment control unit 15 an operation instruction signal, with which the supplementary equipment driving device 10 is caused to operate the supplemental equipments so as to get the working apparatus W1 ready for operation, according to signals of operation instructions entered thereinto through the instruction entry control unit 17. The data read-out section 28 reads in data on the state of other working apparatus W2, . . . , based on which it makes a judgement as to whether the working apparatus W1 of its associated work station is ready for operation. The data storage section 29 assigns a specific number of the common data bus 23 to an expanded logic signal and stores temporarily the data with the number. The data write section 30 writes therein data indicating a state of operation of each of the component device 6–10 transmitted from the auxiliary control unit 22.

The instruction entry control unit 17, comprising, for instance, a man-machine interface, etc., enables an operator to enter therethrough instructions for automatic operation or manual operation of the working apparatus W1.

Figure 4:
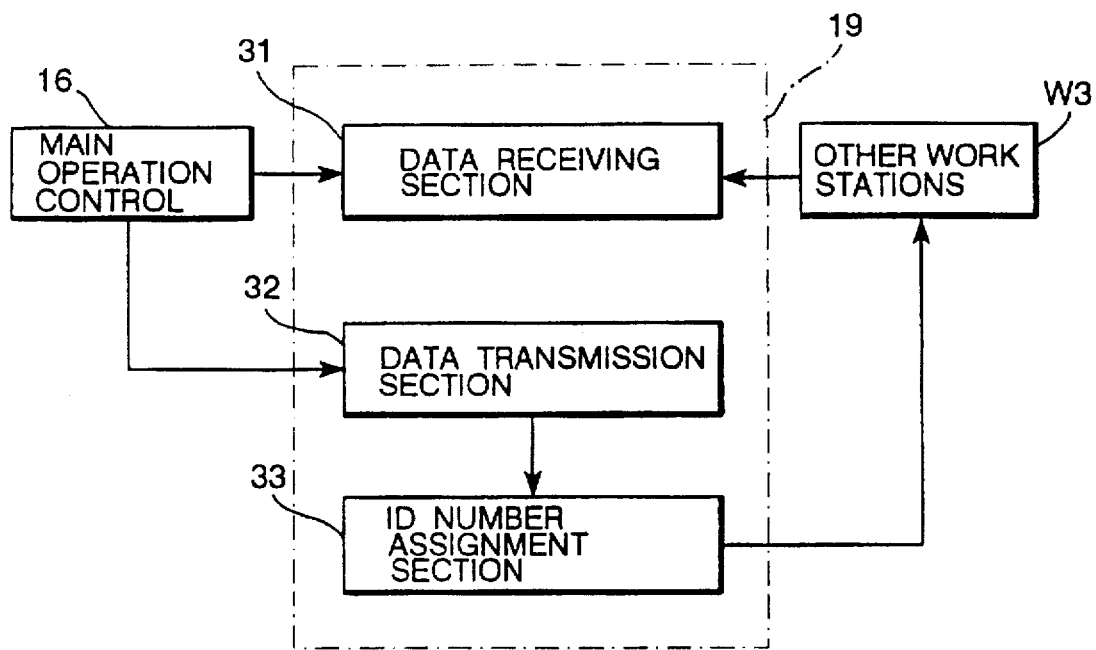
FIG. 4 is a block diagram schematically illustrating a data communications control unit.

As shown in FIG. 4, the data communication control unit 19, comprising, for instance, a station bus interface, includes three sections, namely a data receiving section 31, a data transmission section 32 and an identification number assigning section 33. The data receiving section 31 receives data on the state of other working apparatuses W2, . . . , through the in-line network 18 and transmits them to the main operation control unit 6. The data transmission section 32 receives data on the state of its associated working apparatus W1 and transmits them to the other working apparatuses W2, . . . , through the in-line network 18. The identification number assigning section 33 assigns an identification number to the state data transmitted from the data transmission section 32.

Figure 5:
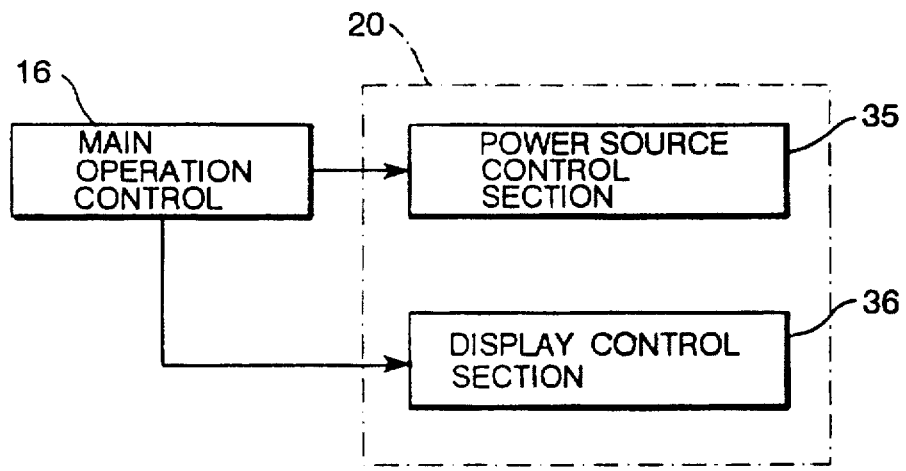
FIG. 5 is a block diagram schematically illustrating an assisting equipment control unit.

As shown in FIG. 5, the assisting equipment control unit 20 includes two sections, namely a power source control section 35 for supplying an electric power to various electrically operative devices in response to an operation instruction signal transmitted from the main operation control unit 16 and a display control section 36 for providing for the display device a display instruction signal with which the display device displays a sign indicating that the component devices 6–10 are under operation or a sign indicating that any of them is out of order.

The subroutine control unit 21 stores temporarily failure data upon an occurrence of failure of any one of the component devices 6–10 and transmits it, at an appropriate timing, to both the working apparatuses W2, . . . , and the line control unit 1a through the communication control unit section 19.

Figure 6:
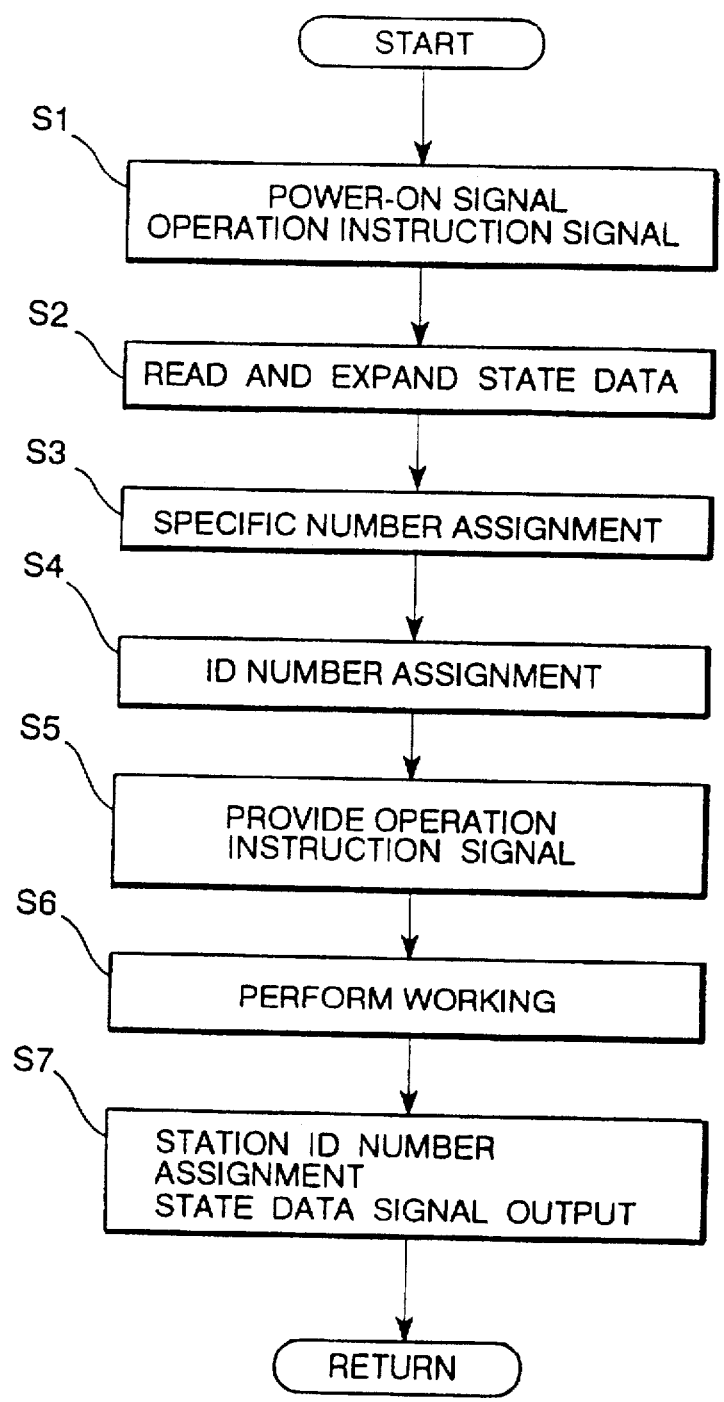
FIG. 6 is a flow chart illustrating a component device operation control sequence routine.
Figure 7:
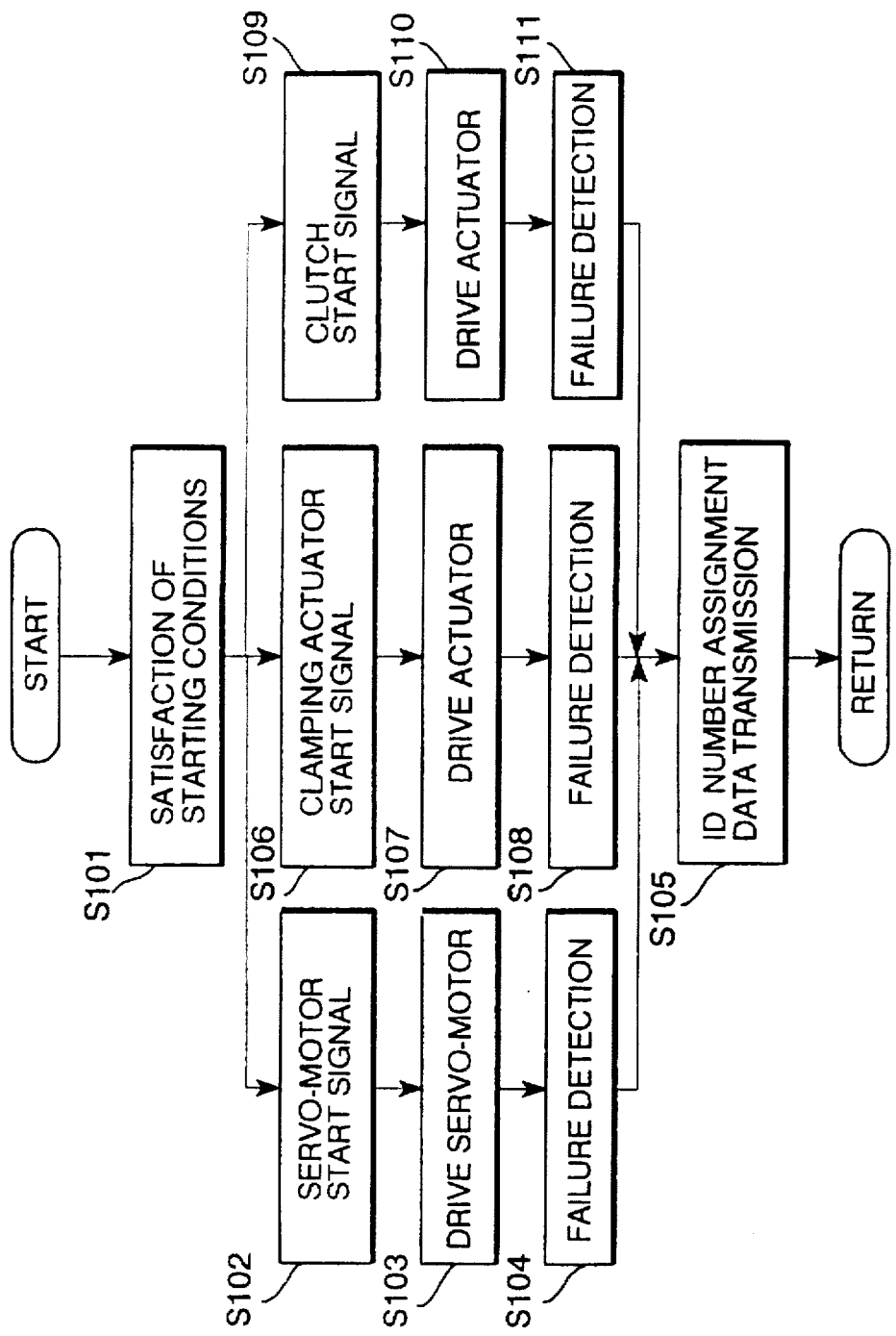
FIG. 7 is a flow chart illustrating a tool exchange sequence routine.

The operation of the sequential control device 5 depicted in FIG. 1 will be well understood by reviewing FIGS. 6 and 7, which are flow charts illustrating sequential control routines for the microcomputer. Programming a computer is a skill well understood in the art. The following description is written to enable a programmer having ordinary skill in the art to prepare an appropriate program for the microcomputer. The particular details of any such program would of course depend upon the architecture of the particular computer selected.

FIG. 6 is a flow chart illustrating the component device control sequence routine. The sequence commences and control passes directly to a function block at step S1 where, when an operation instruction signal is entered into the main operation control unit 16 through the instruction entry control unit 17, the main operation control unit 16 transmits a power-on signal to the power source control section 35 of the assisting equipment control unit 20 so as to supply an electric power to the necessary parts of the production facility. Simultaneously, the main operation control unit 16 transmits an operation instruction signal to the supplementary equipment control unit 15 so as to cause the supplementary equipment driving device 10 to operate the supplemental equipments, thereby getting the working apparatus W1 ready for operation. On the occasion of an emergency stop, or otherwise accidental suspension, restoration of the component devices to their normality takes place also at step S1. Subsequently, at step S2, the main operation control unit 16 at the data read-out section 28 reads data on the state of other working apparatus W2 from the communication control unit 19 and data on the state of supplementary equipment driving device 10 from the supplementary equipment control unit 15 and expands these state data to provide a logic signal on the basis of which a judgement is made as to whether the working apparatus W1 is ready for operation. Then, at step S3, the main operation control unit 16 at the data storage section 29 assigns a specific number of the common data bus 23 to the expanded logic signal and temporarily stores it with the specific number until a completion of one cycle of the control sequence terminates.

At step S4, the auxiliary control unit 22 assigns identification numbers corresponding to the specific numbers of the common data bus 23 to signals transmitted to the main operation control unit 16 from the respective terminal control units 11–15. Simultaneously, or immediately thereafter, at step S5, the main operation control unit 16 gives the terminal control units 11–15 operation instruction signals, respectively. These operation instruction signals causes the terminal control units 11–15 to drive the component devices 6–10, respectively, so as thereby to perform specific working, such as drilling or machining, automatically on a workpiece, at step S6. Finally, at step S7, the communication control unit 19 at the identification number assigning section 33 assigns an apparatus identification number to the operational state signal relating to each of the component device 6–10 transmitted from the main operation control unit 16 and then, provides for the other working apparatus W2 a signal of state representing completion of working, or otherwise failure of any component devices 6–10, at an appropriate timing.

Referring to FIG. 7, which is a flow chart illustrating the tool exchange sequence routine, the tool exchange sequence commences in response to a start signal provided by the main operation control unit 16 in such a way to actuate the head drive control unit 12 so as to cause the tool exchange head driving device 7 to operate. Immediately after the commencement of the sequence routine, the head drive control unit 12 at the starting condition judging section 24 judges states of essential operational elements (not shown), such as a servo-motor, a clamping actuator, a clutch, etc., of the tool exchange head driving device 7. When, for instance, the servo-motor is judged to be ready for starting at step S101, the head drive control unit 12 provides for the servomotor a start signal at the starting signal output section 25 at step S102. After starting of the servo-motor at an appropriate timing at step S103, the head drive control unit 12 at the failure detection section 26 detects a state of operation of the servo-motor at step S104. Subsequently, at step S105, the head drive control unit 12 transmits a signal indicating the state of operation, or a state of failure, of the servo-motor to the auxiliary control unit 22 where an identification number is assigned to the signal. Further, at step S105, the auxiliary control unit 22 transmits the signal with the identification number to both the main operation control unit 16 and subroutine control unit 21 through the common data bus 23.

Similarly, when the clamping actuator is judged to be ready for clamping at step S101, the head drive control unit 12 provides for the clamping actuator a clamping signal at the starting signal output section 25 at step S106. After the start of the clamping actuator at an appropriate timing at step S107, the head drive control unit 12 at the failure detection section 26 detects a state of operation of the clamping actuator at step S108. Subsequently, at step S105, the head drive control unit 12 transmits a signal indicating a state of operation, or a state of failure, of the clamping actuator to the auxiliary control unit 22 where an identification number is assigned to the signal and the auxiliary control unit 22 transmits the signal with the identification number to both the main operation control unit 16 and subroutine control unit 21 through the common data bus 23.

Similar operations take place through steps S101, S109–S111, and S105 in order for the clutch.

When the head driving device 7 completes an exchange of tools, data on the tool exchange, or otherwise data on failure of the head driving device 7, is sent to and stored in the main operation control unit 16 at the data write section 30. This data is fetched and transmitted to the terminal control units 11–15 and/or the other working apparatus W2 as necessary. When it is proved based on the data on states of the working unit M1, etc. put out to the line control unit 1a from the working apparatuses W1 and W2 that the working have been performed to workpieces, respectively, the line control units 1a provides for the workpiece transportation line 1 a line drive instruction signal so as to transport the workpieces to succeeding work stations, respectively.

Because the main operation control unit 16 governs and controls the terminal control units 11–15 for the respective component devices 6–10 of the working unit M1 of the working apparatus W1 at each work station and the communication control unit 19 for data communication between other work stations, the operation of each working apparatus is autonomous. This yields independence of designing working for each work station from the overall system and consequently, not only reduces a time necessary to design the control system of each work station but also enables it easy to make design changes in accordance with local changes in specification of the work station. In addition, a trial run of the work station is performed separately from the overall system.

Figure 8:
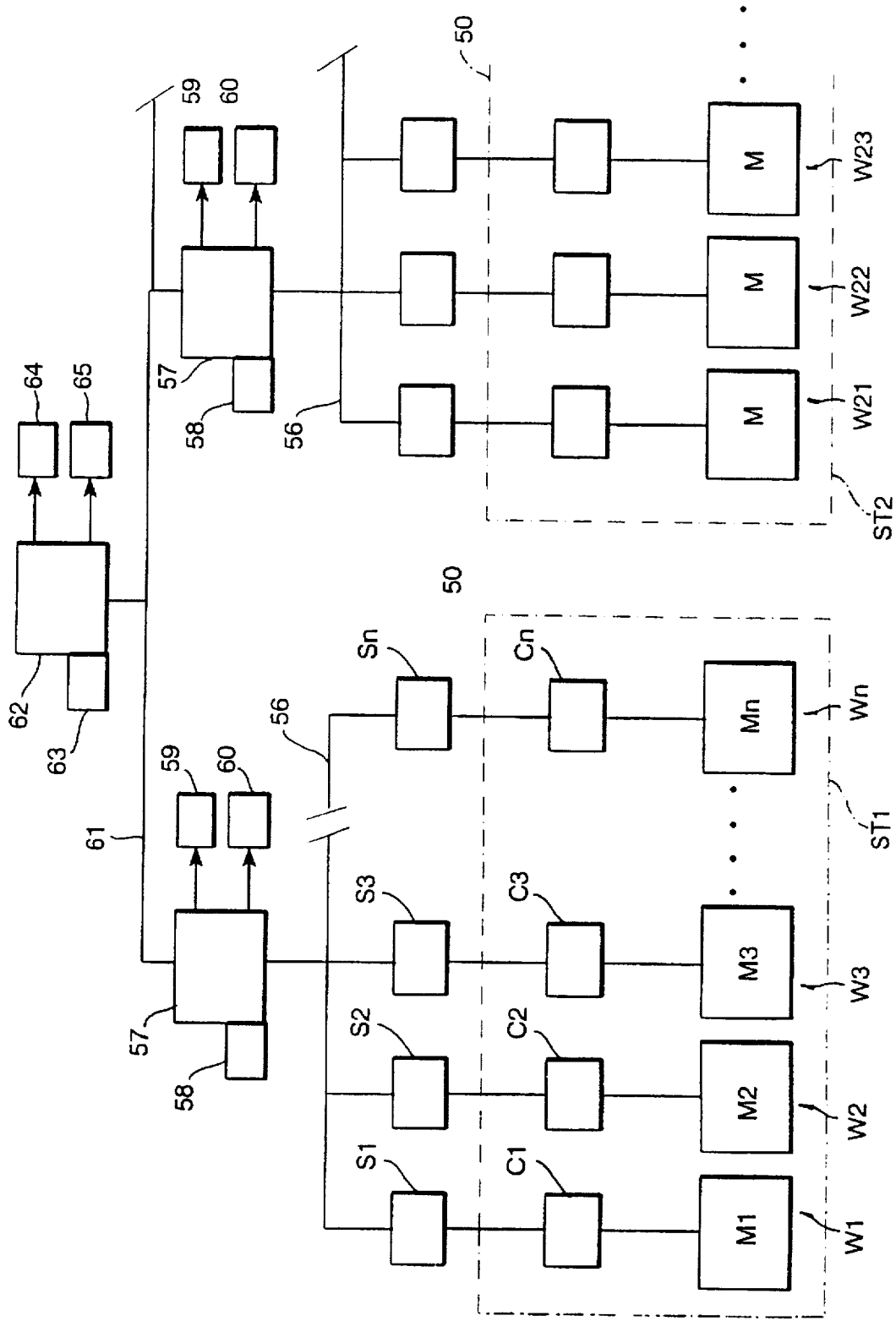
FIG. 8 is a block diagram schematically illustrating a production facility control system in accordance with another preferred embodiment of the present invention.

FIG. 8 shows a control system for performing unified control of an automatic production facility in accordance with another preferred embodiment of the present invention in which an improvement has been achieved in tool control and failure control. An automatic production facility 50 includes a plurality of work stations ST1, ST2, . . . . Each of these work stations forms, for instance, a specific working line, such as a cutting line, a drilling line, etc., having n working apparatuses W1, W2, . . . and Wn, such as transfer machines, which comprise component working units M1, M2, . . . and Mn and terminal control units C1, C2, . . . and Cn, respectively. These component working units M1, M2, . . . and Mn are independently controlled by the terminal control units C1, C2 . . . and Cn, respectively, to perform automatically different types of working on workpieces. Workpieces placed on pallets are machined by the respective working apparatuses W1, W2, . . . and Wn one after another at the first work station ST1 and subsequently, by working apparatuses W21, W22 . . . at the second work stations ST2, and thereafter at following work stations in order.

Figure 9:
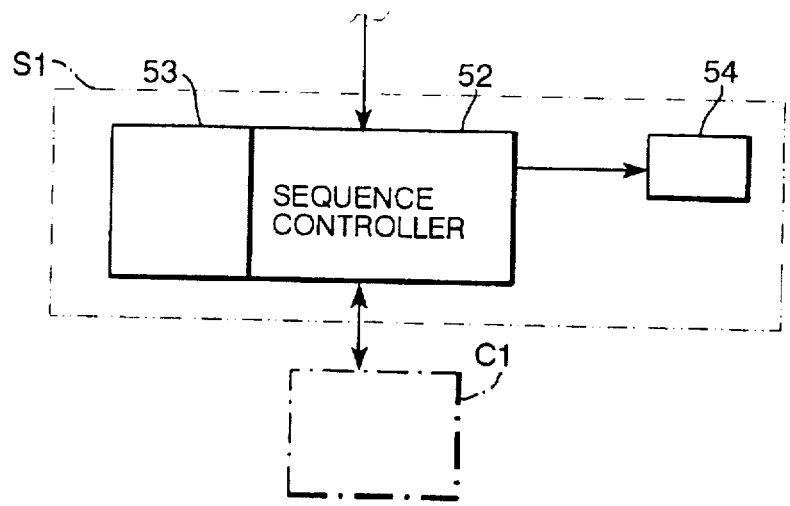
FIG. 9 is a block diagram schematically illustrating an intermittent sequence control unit.

For the working units M1, M2 . . . and Mn, data communications are made among the terminal control units C1, C2, and Cn and intermittent sequence control units S1, S2, . . . and Sn, respectively. As shown in FIG. 9, each of these intermittent sequence control units S1, S2, . . . and Sn comprises a sequence controller 52, such as mainly comprising a programmable logic controller (PLC), a data entry keyboard 53 and a display device 54. The intermittent sequence control units S1, S2, . . . and Sn are interfaced to a main operation control unit 57, such as mainly comprising a programmable logic controller (PLC), through a data communications network 56. The main operation control unit 57, which is provided with a data entry keyboard 58, a display device 59 such as a CRT display device and a printer 60, governs and controls the intermittent sequence control units S1, S2, . . . and Sn. These main operation control units 57 and intermittent sequence control units S1, S2, . . . and Sn form a separated type of control system. A data communications network 61 interfaces each main operation control unit 57 to an inclusive control unit, such as a host computer 62, for governing production management. This host computer 62, which is provided with a data entry keyboard 63, a display device 64 such as a CRT display device and a printer 64, governs and controls the main operation control units 57.

As will be described in detail later, each of the intermittent sequence control units S1, . . . S2, and Sn has been loaded with a program for service number information management and failure information management. The service number information management, which takes places and is repeated with a very short period during operation of the working apparatus W1, W2 . . . and Wn, is a control to manage information necessary to count the number of times of services of a working tool to be transmitted to the main operation control unit 57.

Figure 10:
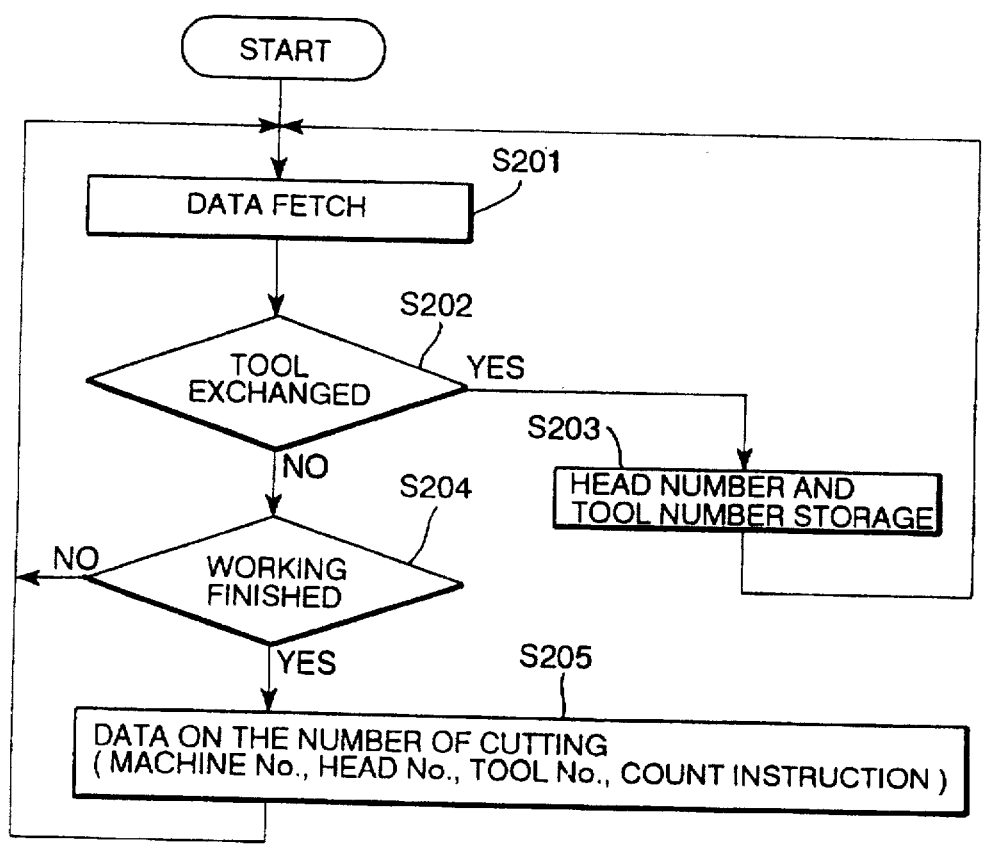
FIG. 10 is a flow chart illustrating a sequence routine of service number information management.

Referring to FIG. 10, which is a flow chart of the sequence routine of service number information management which is performed in the respective intermittent sequence control units Si (i is an integer between 1 and n), the sequence logic commences and control passes directly to a function block S201 where various signals are fetched from the terminal control unit Ci and transmitted to the sequence controller 52 of its associated intermittent sequence control unit Si. Subsequently, a decision is made for each working apparatus Wi at step S202 as to whether there was effected an exchange of tools by means of, for instance, a head driving device 7 as described in connection with a previous embodiment shown in FIG. 1, by tool exchange control by the intermittent sequence control unit Si. If the answer is "YES," then, after storing information on the tool exchange, which includes at least a head number and a tool number, in the sequence controller 52 of the intermittent sequence control unit Si at step S203, the sequence is repeated again with reading in signals at step S201. However, if the answer is "NO," then, another decision is made based on control information transmitted from the terminal control unit Ci at step S204 as to whether working has taken place a single time for a workpiece. If working has not yet taken place, i.e. the answer is "NO," then, the sequence is repeated again with reading in signals at step S201. On the other hand, if the answer to the decision made at step S204 is "YES," then, the intermittent sequence control unit Si transmits information on the number of times of services of the working tool, which includes at least a head number, a tool number and a count instruction, to the sequence controller 52 of the intermittent sequence control unit Si at step S205. Thereafter, another cycle of the service number information management sequence routine starts with reading in signals at step S201. As described above, because the service number information management sequence routine is regularly performed by the sequence controllers 52 of the intermittent sequence control units S1, S2, . . . and Sn for the working apparatuses W1, W2, . . . and Wn, respectively, the main operation control unit 57 counts the service number of times of working for every tool of each tool head of the working apparatus W1, W2, . . . , Wn. In order to count the service number of times of working, the main operation control unit 57 has the same number of counters as tools attached to each tool head of each working apparatus W1, W2 . . . , Wn so as to count the numbers of times of services of the respective tools.

Figures 11, 12:
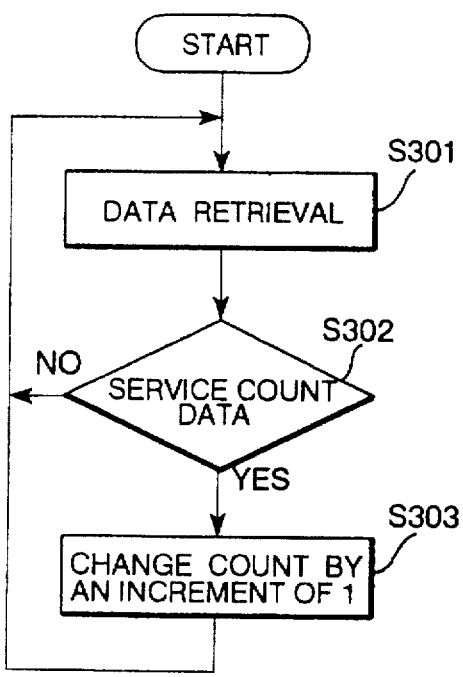
FIG. 11 is a flow chart illustrating a service number count control routine.
FIG. 12 is an illustration showing a memory of the main operation control unit.

FIG. 11 shows a flow chart of the service number count control routine which is repeated with a very short period during operation of at least any one of the working apparatus W1, W2, . . . , and Wn. Sequence logic commences and control passes directly to a function block S301 where various signals are transmitted from the intermittent sequence control units Si and read in the main operation control unit 57. Subsequently, a decision is made for each working tool of each working apparatus Wi at step S302 as to whether there has been read in information on a count of services of the working tool. If the answer is "NO," then, the sequence is repeated again with reading in signals at step S301. On the other hand, if the answer to the decision is "YES," then, the counter associated with the working tool changes its count by an increment of one (1) at step S303 and another cycle of the service number count control routine starts with reading in signals at step S301.

Extreme numbers of times of services are previously established for tools of the respective tool heads of each working apparatus W1, W2 . . . , Wn as shown in FIG. 12.

Referring to FIG. 12, a memory of the main operation control unit 57 has bands assigned to a plurality of working tools No. 1, No. 2, . . . respectively. Each band stores data on the counted number of times of services of its associated working tool and the predetermined extreme number of times of services intrinsic to the working tool. Each extreme number of times of services is changeable and entered through the keyboard 58. In addition to performing the service number count control routine, the main operation control unit 57 provides for the intermittent sequence control unit Si a warning signal indicating that an in-use working tool has to be exchanged with a new one when the predetermined extreme number of times of services of the working tool is reached. Simultaneously, the main operation control unit 57 transmits information on the head number, the tool number, the counted number of times of services and the predetermined extreme number of times of services regarding the tool to the intermittent sequence control unit Si so as to present the information on its display device 54 for operator's reference. Further, the main operation control unit 57 is able to transmit information on such a head number, a tool number, a counted service number of times of cutting and the predetermined extreme service number of times regarding any tool to its associated intermittent sequence control unit Si upon a request from the intermittent sequence control unit Si so as to present the information on its display device 54 for operator's reference. When the tool is exchanged with new one, the counted number of times of services and/or the predetermined extreme number of times of services can be reset or changed through the keyboard 53 and the new information is transmitted to the main operation control unit 57 and written over the previous information in the band associated with the working tools.

Figure 13:
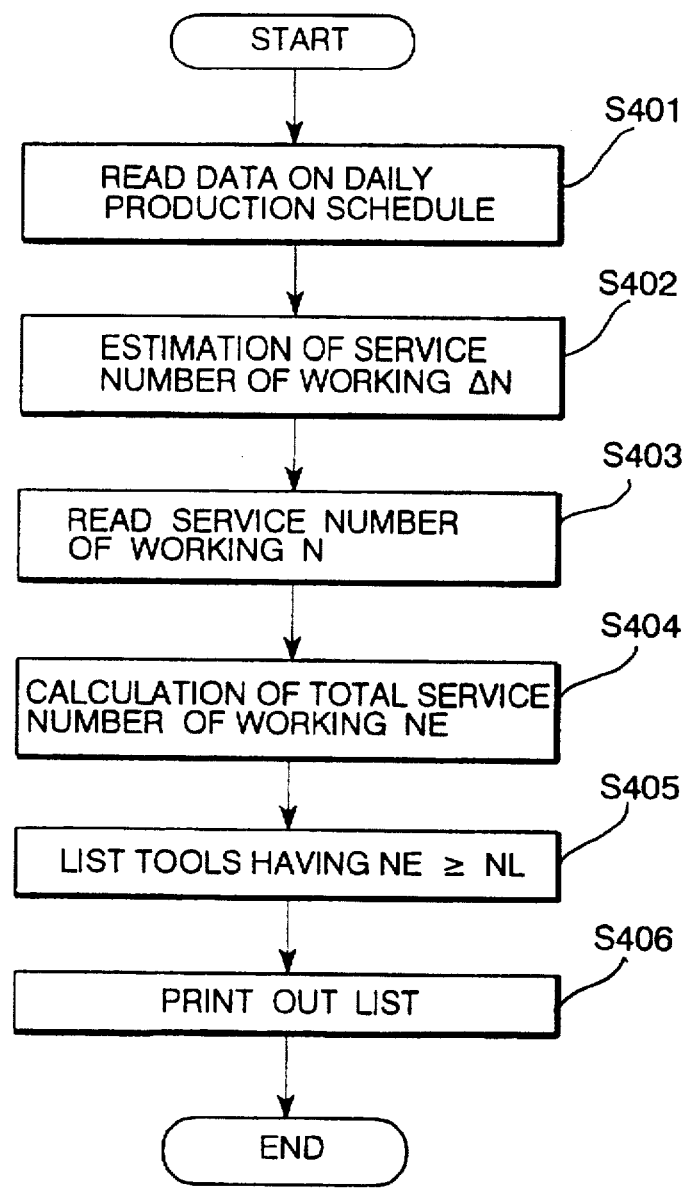
FIG. 13 is a flow chart illustrating a tool listing sequence routine.

FIG. 13 is a flow chart of a tool listing sequence routine which is performed by the host computer 62 to list working tools to be exchanged. The host computer 62 stores information on daily, weekly and monthly production schedules and information on working, including types of working tools, numbers of serviceable times of these working tolls, etc., for each of a plurality of types of working.

The tool listing sequence routine commences and control passes directly to a function block at step S401 where information on a daily production schedule for another eight hours (i.e. the following day) is fetched. Based on the daily production schedule, calculations are made at step S402 so as to estimate numbers of times of services ΔN for eight hours for working tools by tool head and by working apparatus. Subsequently, information on the number of times of practical services N of each working tool is fetched at step S403 and the estimated total number of times of services NE for the working tool is calculated as the sum of these practical and estimated numbers of times of services N and ΔN at step S404. At step S405, the host computer 62 lists working tools which have their estimated total numbers of times of services NE not less than their predetermined extreme numbers of times of service NL, respectively, by tool head and by working apparatus. Finally, at step S406, a list of types of the working tools, having their estimated total numbers of times of services NE not less than their predetermined extreme numbers of times of service NL, is printed out by a printer 65. Taking a look at the list of working tool types, the operator can supply and deliver necessary types and numbers of working tools to any work stations ST1, ST2, . . . .

Figure 14:
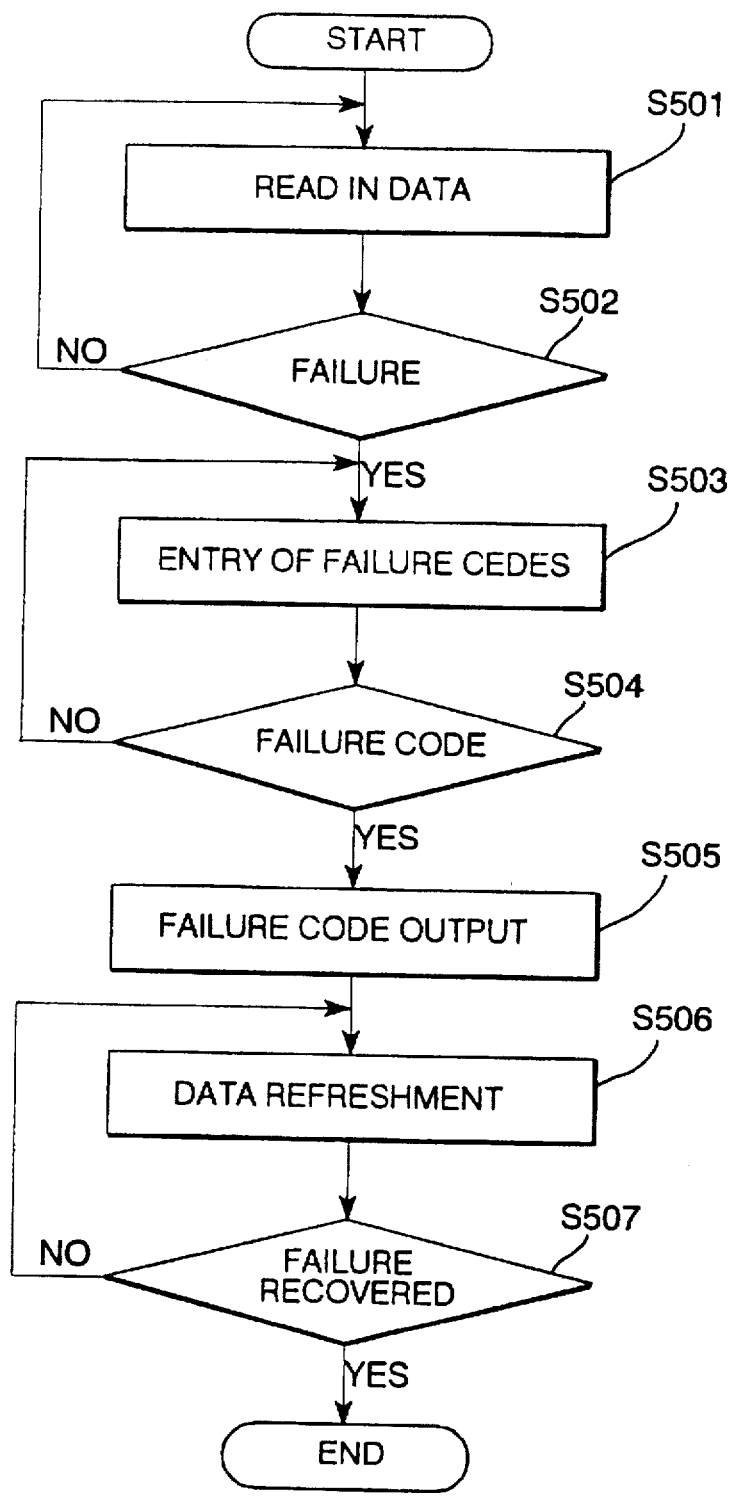
FIG. 14 is a flow chart illustrating a failure information management sequence routine.

FIG. 14 is a flow chart illustrating a failure information management sequence routine which is repeatedly performed with a very short period in each of the intermittent sequence control units S1, S2, . . . and Sn during operation of the working apparatus W1, W2 . . . or Wn. The sequence routine commences and control passes to a function block at step S501 where various information are transmitted from the terminal control unit Ci to its associated intermittent sequence control unit Si. Subsequently, a decision is made at step S502 based on these information as to whether there has occurred a mechanical failure in the working apparatus Wi. If the answer is "NO," then, the sequence is repeated again with reading in information at step S501. On the other hand, if the answer to the decision is "YES," i.e. there has been some failures, then, data entry is made through the keyboard 53 at step S503. For the data entry, the operator first specifies parts or components and types of mechanical failures and enters two kinds of failure codes, namely failure component codes and failure type codes with reference to a failure code table as shown in FIG. 15. The failure code table lists thereon various failure codes indicating failure components or parts (names and numbers of parts) and failure types or categories such as reparable, replacement, etc.

Subsequently, another decision is made at step S504 as to whether any failure codes have been entered. This decision is repeated until a failure code entry. Once failure codes have been entered, after having transmitted data on the failure codes to the main operation control unit 57 at step S505, data stored in the intermittent sequence control unit Si are refreshed at step S506. Finally, a decision is made based on the refreshed data at step S507 as to whether the failure has been eliminate or repaired. If the answer is "NO," then, the data refreshment and decision are repeated again at steps S506 and S507 until an elimination or repair of the failure. On the other hand, if the answer to the decision is "YES," the failure information management sequence routine returns and is repeated.

In such a manner described above, failure information on the respective working apparatus W1, W2 . . . , and Wn are transmitted to the main operation control unit 57 for in order to search a table of parts stock which is renewed every time of parts replacement and find any supply parts, with which the failure parts are replaced, on the table. Data on the supply parts including names and numbers of the supply parts are transmitted, on one hand, to the sequence controllers 52 of the respective sequence control units S1, S2, . . . and Sn and, on the other hand, to the host computer 62.

Accordingly, the host computer 62 provides promptly and easily a list of parts necessary to be stocked or purchased.

With the production line control system having the service number counters, because the main operation control unit 57 receives and unifies information on the numbers of times of services of working tools, transmitted from the sequence controllers 52 of the respective intermittent sequence control units S1, S2, . . . and Sn, by tool head and/or by working apparatus, it is loaded with much less tool exchange information processing load. Furthermore, since the main operation control unit 57 transmits information on exchange of working tools to the sequence controllers 52 of the respective intermittent sequence control units S1, S2, . . . and Sn, the unified control of information is not accompanied with any adverse effect. In addition, because the host computer 62 receives information on the numbers of times of practical working services and available working services, transmitted from the main operation control unit 57, and provides a list of working tools to be exchanged based on the information, the information on the numbers of times of services is effectively used. Whenever exchanges of tools, the numbers of times of working services can be reset or refreshed through the intermittent sequence control units and the main operation control units. The unified control of failure information on the respective working apparatus, which takes place in the main operation control unit, is loaded with much less failure information processing load.

Because information on recovery of failures is transmitted both to the intermittent sequence control units and to the inclusive control means, delivery and purchase of repair parts is easy.

It is to be understood that although the present invention has been described with regard to particular embodiments thereof, a warning of tool exchange may be given when an in-use working tool services a number of times of working, for instance, approximately 95% of the extreme number of times of working.

It is also to be understood that various other embodiments and variants may occur to those skilled in the art, which are within the scope and spirit of the invention, and such other embodiments and variants are intended to be covered by the following claims.

What is claimed is:

1. A control system for controlling a production facility including a plurality of work stations, each said work station being provided with a plurality of working apparatuses having machining tools, said control system comprising:

working apparatus control means for controlling said working apparatuses, respectively, so as to perform a specified machining operation independently from one another;

intermittent control means interfaced to said working apparatus control means by means of a data communication network so as to communicate data on deterioration of said machining tools of said working apparatus with one another, said intermittent control means governing said working apparatus control means of said respective apparatuses for each said work station and unifying said data on deterioration of said machining tool of said respective working apparatus for each said work station transmitted from said respective working apparatus control means so as to present predetermined attributes of data; and inclusive control means for interfacing to said respective intermittent control means by means of a data communications network so as to communicate data with one another and for governing said intermittent control means for said respective work stations and unifying said data transmitted from said intermittent control means for said respective work stations;

said intermittent control means transmitting, on one hand, data among said predetermined attributes of data intrinsic to each said working apparatus control means and, on the other hand, data of said predetermined attributes of data to said inclusive control means.

2. A control system as defined in claim 1, wherein said inclusive control means comprises a host computer.

3. A control system as defined in claim 1, wherein said data on determination of said machining tool includes number of times a tool is worked for each said working apparatus.

4. A control system as defined in claim 3, wherein each said working apparatus control means displays data the number of times the tool is worked for said working apparatus among said predetermined attributes of data transmitted thereto from said intermittent control means.

5. A control system as defined in claim 3, wherein said inclusive control means lists and displays data on exchanges of tools of said respective working apparatus among said predetermined attributes of data transmitted thereto from said intermittent control means.

6. A control system as defined in claim 1, wherein said data on deterioration of the machining tools includes number of times that a tool of each said working apparatus has serviced and said predetermined attributes of data includes said number of times of serviced working and a predetermined extreme number of times that the tool of said working apparatus is expected to serve.

7. A control system as defined in claim 6, wherein said intermittent control means includes means for changing said predetermined extreme number of times of working.

8. A control system as defined in claim 1, wherein said data on operation includes data on failures of each said working apparatus.

9. A control system as defined in claim 8, wherein said predetermined attributes of data include data on types of failures.

10. A control system as defined in claim 1, wherein the production facility comprises a machining line for machining works.

* * * * *